(No Model.)
A. G. WILKINS.
WIRE CUTTER.
No. 568,010. Patented Sept. 22, 1896.
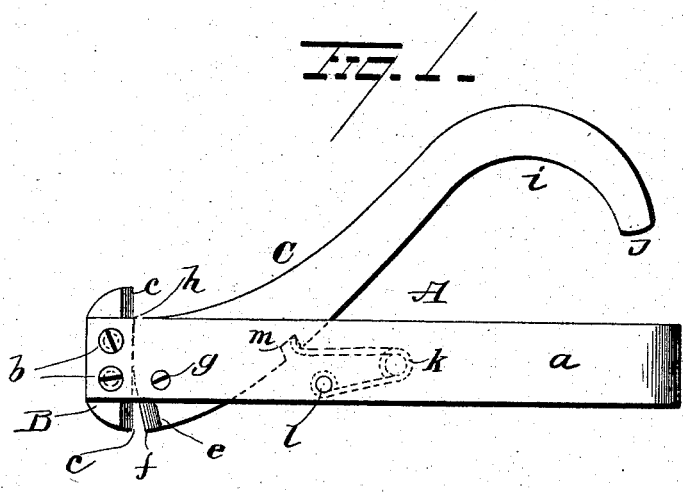
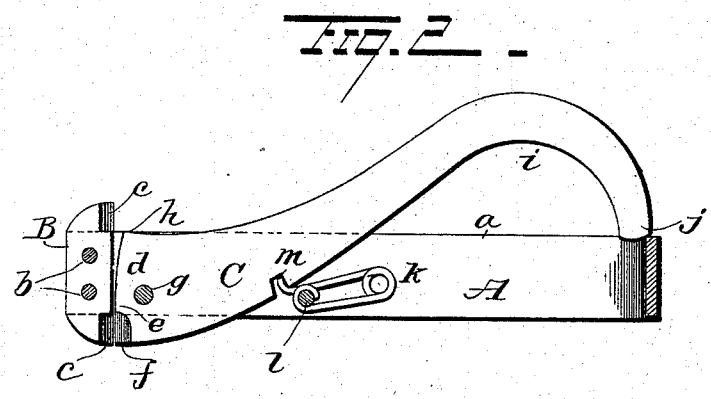
Witnesses
E. F. Nottingham
G. F. Downing
Inventor
A. G. Wilkins
By H. A. Seymour
Attorney

UNITED STATES PATENT OFFICE.

ALEXANDER G. WILKINS, OF MEADVILLE, PENNSYLVANIA.

WIRE-CUTTER.

SPECIFICATION forming part of Letters Patent No. 568,010, dated September 22, 1896.

Application filed July 26, 1895. Serial No. 557,229. (No model.)

*To all whom it may concern:*

Be it known that I, ALEXANDER G. WILKINS, a resident of Meadville, in the county of Crawford and State of Pennsylvania, have invented certain new and useful Improvements in Wire-Cutters; and I do hereby declare the following to be a full, clear, and exact description of the invention, such as will enable others skilled in the art to which it appertains to make and use the same.

My invention relates to an improvement in wire-cutters, the object of the invention being to so construct a wire-cutter that it shall have cutting edges directly opposite each other.

A further object is to construct a wire-cutter in such manner that the wire to be cut can have a flat bearing, while being cut, at opposite sides of the cutting edges.

A further object is to produce a wire-cutter having a stationary and a movable cutting edge disposed opposite and in line with each other, the movable cutter being so constructed and arranged that it will operate on the wire with a "drawing cut."

A further object is to produce a wire-cutter which shall be simple in construction, comprise a small number of parts, which shall be cheap to manufacture, and which shall be effectual in all respects in the performance of its functions.

With these objects in view the invention consists in certain novel features of construction and combinations and arrangements of parts, as hereinafter set forth, and pointed out in the claims.

In the accompanying drawings, Figure 1 is an elevation illustrating my improvements. Fig. 2 is a sectional view.

A represents the body portion or handle of the device and is preferably composed of a piece of strap metal bent upon itself to form two parallel members $a$ $a$ with a space between them.

Between the free ends of the members or parts $a$ $a$ a transverse cutter-bar B is secured by means of screws $b$, both ends of said cutter-bar projecting laterally beyond the edges of the body portion or handle A and each end being made with a cutting edge $c$.

Between the parallel members $a$ $a$ of the body portion or handle A a lever C is disposed. The outer end of the lever C is widened, as at $d$, so as to form a curved edge $e$, at one end of which a cutting edge $f$ is made. Between the ends of the widened portion $d$ the lever C is pivotally connected between the members $a$ $a$ of the handle by means of a screw $g$, so that the cutting edge $f$ will be opposite one of the cutting edges $c$ of the cutter-bar B. The end of the curved edge $e$ opposite the cutting edge $f$ constitutes a stop $h$, which abuts against the cutter-bar and limits the movement in one direction of the lever. The free end of said lever is preferably curved, as at $i$, and the end $j$ abuts against the inner end of the body portion or handle A, as at $j$, the point $j$ thus constituting a stop for the lever to prevent the actual engagement of the respective cutting edges. The cutter is maintained normally open by means of a spring $k$, disposed between the members of the handle and projected thereby. The spring $k$ is preferably made of a single piece of wire coiled between its ends to form two arms, one arm being secured to a pin $l$, passing through the handle, and the other arm being made to enter a notch $m$ in the lever.

From the construction and arrangement of parts above described it will be seen that the wire to be cut will have a flat bearing between the cutting edges against the parallel edges of the parts $a$ $a$ of the body portion or handle A, so that the wire will be severed squarely. It will also be observed that as the cutting edge $f$ on the lever moves in the arc of a circle during its passage through the wire said cutting edge $f$ will operate on the wire with a drawing cut. By providing a double-ended cutter-bar B, secured to the body portion A by means of screws, when one edge becomes dulled or broken the said cutter-bar can be reversed end for end and the other cutting edge brought into position for use.

My improved device is designed particularly for use in removing metallic fasteners from shoes, but it is evident that it is equally efficient for other purposes.

My improvements are very simple in construction, comprise few parts, and are effectual in all respects in the performance of their functions.

Having fully described my invention, what

I claim as new, and desire to secure by Letters Patent, is—

1. In a wire-cutter, the combination with a handle comprising two members, a cutter secured between said members and a cutter-lever pivoted between the members of the handle and having a cutter formed on one of its extreme ends which coöperates with the cutter, to sever a wire placed between the cutters, the outer ends of the handle and lever constructed to strike each other and limit the movement of the cutters, substantially as set forth.

2. In a wire-cutter, the combination with a handle consisting of a strap of metal bent upon itself so as to form parallel members, a cutter-bar secured between said members, a lever pivoted between said members of the handle and having a cutting edge to act in conjunction with the cutting edge of the cutter-bar, and a spring secured to the handle and engaging said lever, substantially as set forth.

In testimony whereof I have signed this specification in the presence of two subscribing witnesses.

ALEXANDER G. WILKINS.

Witnesses:
L. L. RICHMOND,
W. F. BIERSMITH.